US006945341B2

United States Patent
Ogawa et al.

(10) Patent No.: US 6,945,341 B2
(45) Date of Patent: Sep. 20, 2005

(54) BIPEDAL ROBOT

(75) Inventors: Kenichi Ogawa, Wako (JP); Takuro Koyanagi, Wako (JP); Susumu Miyazaki, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/381,685

(22) PCT Filed: Sep. 20, 2001

(86) PCT No.: PCT/JP01/08183

§ 371 (c)(1),
(2), (4) Date: May 15, 2003

(87) PCT Pub. No.: WO02/28601

PCT Pub. Date: Apr. 11, 2002

(65) Prior Publication Data

US 2004/0003950 A1 Jan. 8, 2004

(30) Foreign Application Priority Data

Sep. 29, 2000 (JP) ........................ 2000-300409

(51) Int. Cl.[7] .............................................. B62D 57/02
(52) U.S. Cl. ............................................ 180/8.1; 901/1
(58) Field of Search ........................ 180/8.1, 8.6; 901/1; 446/352, 353, 354, 355

(56) References Cited

U.S. PATENT DOCUMENTS 6,564,888 B1 * 5/2003 Gomi et al. ................. 180/8.6
6,583,595 B1 * 6/2003 Hattori et al. ............... 318/567
6,697,709 B2 * 2/2004 Kuroki et al. ............... 700/245

FOREIGN PATENT DOCUMENTS

| JP | 05-285864 | | 11/1993 | |
| JP | 07205069 A | * | 8/1995 | ............. B25J/9/16 |
| JP | 07-205070 | | 8/1995 | |
| JP | 08216066 A | * | 8/1996 | ............. B25J/5/00 |

* cited by examiner

Primary Examiner—Kevin Hurley
(74) Attorney, Agent, or Firm—Rankin, Hill, Porter & Clark LLP

(57) ABSTRACT

A bipedal robot has an upper body that includes a higher upper body and a lower upper body. The higher upper body and the lower upper body are coupled to each other by a rotating mechanism so as to be rotatable with respect to each other about a vertical axis of rotation. Two legs extend from the lower upper body, and two arms extend from respective shoulders on opposite sides of the higher upper body. The higher upper body of the robot has a thickness in a forward/rearward direction and the lower upper body has a width in a lateral direction, the thickness and the width being smaller than the width in a lateral direction of the robot at the shoulders. An electric energy storage device, which serves as a power supply for operating the robot is mounted in the higher upper body, and an electronic circuit unit for controlling operation of the robot are mounted in the lower upper body. With this robot arrangement, the robot is capable of increased working capability without impairing the stability of the attitude when the robot works.

8 Claims, 4 Drawing Sheets

BIPEDAL ROBOT

TECHNICAL FIELD

The present invention relates to a bipedal robot.

BACKGROUND ART

Bipedal robots which have in recent years been proposed for practical use by the present applicant and others and which have been known in general are basically human-shaped robots. Like human beings, they have two legs extending from a hip at the lower end of an upper body (torso), and two arms extending from shoulders on the left and right opposite sides of the upper body.

Robots which carry an electric energy storage device as a power supply for operating the robots also have an electronic circuit unit (controller) that is usually mounted on an upper body of the robot for controlling operation of the electric energy storage device and the robot.

For a bipedal robot to be able to carry out various works in a variety of environments, it is desirable that the tip ends of the arms of the robot reach as far a position as possible.

If arms are elongated, then the tip ends of the arms can reach a far position. However, if arms are too elongated, then the robot tends to lose the stability of its attitude when the arms are extended and perform some work, and finds it difficult to work with the arms at a location close to the robot.

When a conventional bipedal robot is to grip, with its arms, an object that is present laterally of the robot, the robot basically moves the legs to direct the robot in its entirety to face the object. In environments where the footing is unstable or limited to a small area, however, it may be difficult to move the legs to change the direction of the robot in its entirety. In those environments, the robot practically fails to grip the object.

The present invention has been made in view of the above background. It is an object of the present invention to provide a bipedal robot which is capable of increasing its working capability without impairing the stability of the attitude when the robot works.

Another object of the present invention is to provide a bipedal robot whose maintenance can easily be carried out.

DISCLOSURE OF THE INVENTION

In order to achieve the above objects, a bipedal robot according to the present invention which has two legs extending from a lower end of an upper body and two arms extending from shoulders on opposite sides of the upper body is characterized in that said upper body comprises a higher upper body and a lower upper body, said higher upper body and said lower upper body being coupled to each other by a rotating mechanism having a vertical axis of rotation, and being rotatable with respect to each other about said axis of rotation, and said two arms extend from said higher upper body and said two legs extend from said lower upper body.

Prior to describing the present invention in greater detail, a supplementary description of some terms used in the present specification is given below. In the present specification, the direction of a line interconnection two shoulders on opposite sides of a higher upper body of a robot (the direction in which the shoulders are parallel to each other) is referred to as a lateral direction of the higher upper body, and the direction perpendicular to the lateral direction and the vertical direction is referred to as a forward/rearward direction of the higher upper body. The direction in which two legs of the robot are parallel to each other at the time the robot is in an upstanding state is referred to as a lateral direction of the lower upper body, and the direction perpendicular to the lateral direction and the vertical direction is referred to as a forward/rearward direction of the lower upper body or a forward/rearward direction of the robot.

With the invention as described above, when the higher upper body is rotated clockwise or counterclockwise with respect to the lower upper body about the axis of rotation of the rotating mechanism, from a state in which a forward/rearward direction of the higher upper body and a forward/rearward direction of the lower upper body are aligned with each other (the state will hereinafter be referred to as a basic attitude state of the upper body), for example, one of shoulders on left and right opposite sides of the higher upper body is moved forwardly in the forward/rearward direction of the lower upper body. Therefore, when the arm extending from the forwardly moved shoulder is extended forwardly of the lower upper body, a distal end of the arm can reach a farther position than when the upper body is in the basic attitude state. Thus, the arms can be relatively short, but can grip a relatively far object. At this time, since the other shoulder and the arm extending therefrom are moved rearwardly of the lower upper body, when the arm extending from the forwardly moved shoulder is extended forwardly, the arm extending from the rearwardly moved shoulder can easily keep the robot balanced in weight in the forward/rearward direction (the forward/rearward direction of the lower upper body), thus easily achieving the stability of the attitude of the robot.

By thus rotating the higher upper body with respect to the lower upper body, the higher upper body from which the two arms extend can be oriented in various directions without the need for moving the two legs extending from the lower upper body. Therefore, even in an environment where the footing is unstable, the two legs extending from the lower upper body can remain on an area where the robot can stand stably, and an object present laterally of the lower upper body with respect to the forward/rearward direction can easily be gripped by the arms.

The bipedal robot according to the present invention is thus capable of increasing its working capability without impairing the stability of the attitude when the robot works.

According to the present invention, furthermore, said higher upper body preferably has a thickness in the forward/rearward direction which is smaller than the width in the lateral direction of the robot at said shoulders, and said lower upper body preferably has a width in the lateral direction which is smaller than the width in the lateral direction of the robot at said shoulders.

With this arrangement, when the higher upper body is rotated about 90°, for example, with respect to the lower upper body about the axis of rotation of the rotating mechanism from the basic attitude state of said upper body, the maximum width in the lateral direction of the robot can be smaller than the maximum width in the basic attitude state of the upper body (which is the same as the width in the lateral direction of the robot at the shoulders). Therefore, by rotating the higher upper body with respect to the lower upper body, the robot can move (walk) in a narrow passage through which the robot cannot pass if in the basic attitude state.

If the bipedal robot has an electric energy storage device as a power supply for operating the robot and an electronic circuit unit for controlling operation of the robot, then a problem would arise as to which of the higher upper body and the lower upper body the electric energy storage device and the electronic circuit unit have to be mounted in. Mounting both the electric energy storage device and the electronic circuit unit in either one of the higher upper body and the lower upper body would not be preferable as that one of the higher upper body and the lower upper body would become excessively large. The electric energy storage device mounted on the robot as a power supply for operating the robot needs to be of a relatively large capacity, and hence is relatively large in size and weight. Therefore, the location where the electric energy storage device is mounted tends to affect the stability of the robot attitude when the robot walks and works.

It is customary to control the attitude stabilization of a bipedal robot based on an inverted pendulum-type dynamic model as disclosed in Japanese laid-open patent publication No. 5-337849 or U.S. Pat. No. 5,459,659 by the present applicant. The attitude stabilization is controlled by controlling a torque around ankles of the robot with the behavioral characteristics of perturbation of the position of the upper body of the robot being simulated by the behavioral characteristics of an inverted pendulum. A robot under such attitude stabilization control can achieve better robot attitude stability if the center of gravity of the overall robot is in a higher position than it is in a lower position (a vertical position closer to the floor that is contacted by the feet of the robot).

According to the present invention, if the bipedal robot has an electric energy storage device as a power supply for operating the robot and an electronic circuit unit for controlling operation of the robot, then the electric energy storage device is mounted in the higher upper body and the electronic circuit unit is mounted in the lower upper body.

With the above arrangement, since the electric energy storage device which is a heavy object is mounted in the higher upper body, the center of gravity of the overall robot including the electric energy storage device and the electronic circuit unit is in a higher position on the robot, thus increasing the stability of the robot attitude when the robot walks and works. Because the electronic circuit unit is present below the electric energy storage device, heat generated by the electric energy storage device during operation of the robot (while the robot is walking or working) is hardly transmitted to the electronic circuit unit. As a consequence, only the heat generated by the electronic circuit unit is applied to the electronic circuit unit, and the electronic circuit unit is prevented from reaching excessively high temperatures.

The present invention is optimum for a bipedal robot whose attitude stabilization is controlled based on an inverted pendulum-type dynamic model, as described above.

With the bipedal robot according to the present in which the electric energy storage device and the electronic circuit unit are mounted, a holder is preferably fixed to said higher upper body for suspending and holding said robot.

While the robot is being inactivated (its power supply is turned off and the robot cannot stand on its own), the holder can be held to suspend the robot. Since the holder is fixed to the higher upper body in which the heavy electric energy storage device is mounted, the robot can be suspended and held while being kept in an appropriate attitude in which it is unlikely for various parts of the robot to be subjected to burdens (excessive loads or the like) when the robot is suspended. Inasmuch as the heavy electric energy storage device is mounted in the higher upper body to which the holder is fixed, while the robot is being suspended, the weight of the portion of the robot below the rotating mechanism is relatively small, and an excessive load (a tensile load) is prevented from acting on the rotating mechanism. Though it is difficult for the rotating mechanism of this type to increase its level of resistance to tensile loads, since the tensile load acting on the rotating mechanism is reduced, the need for increasing the level of resistance of the rotating mechanism to tensile loads may be small. As a result, the rotating mechanism may be of a relatively simple structure.

According to the present invention as described above, an electric component is preferably mounted on either one of a lower end surface of said higher upper body and an upper end surface of said lower upper body, such that said electric component is exposed out when said rotating mechanism is operated to rotate one of said higher upper body and said lower upper body with respect to the other thereof. The electric component may comprise an electric component associated with the electric energy storage device, such as a terminal for charging the electric energy storage device for operating the robot, or an electric component associated with the electronic circuit unit such as a terminal or a circuit or the like for checking operation of the electronic circuit unit which controls operation of the robot.

Since the electric component can be exposed out when one of said higher upper body and said lower upper body is rotated with respect to the other thereof, it is possible to carry out, with ease, maintenance of the electric component and an operation check on the electric component.

BEST MODE FOR CARRYING OUT THE INVENTION

An embodiment of the present invention will be described below with reference to FIGS. 1 through 4. In FIG. 2, an upper body of a robot is shown, partly omitted from illustration, more simply than in FIG. 1 for illustrative purpose.

Figure 1:
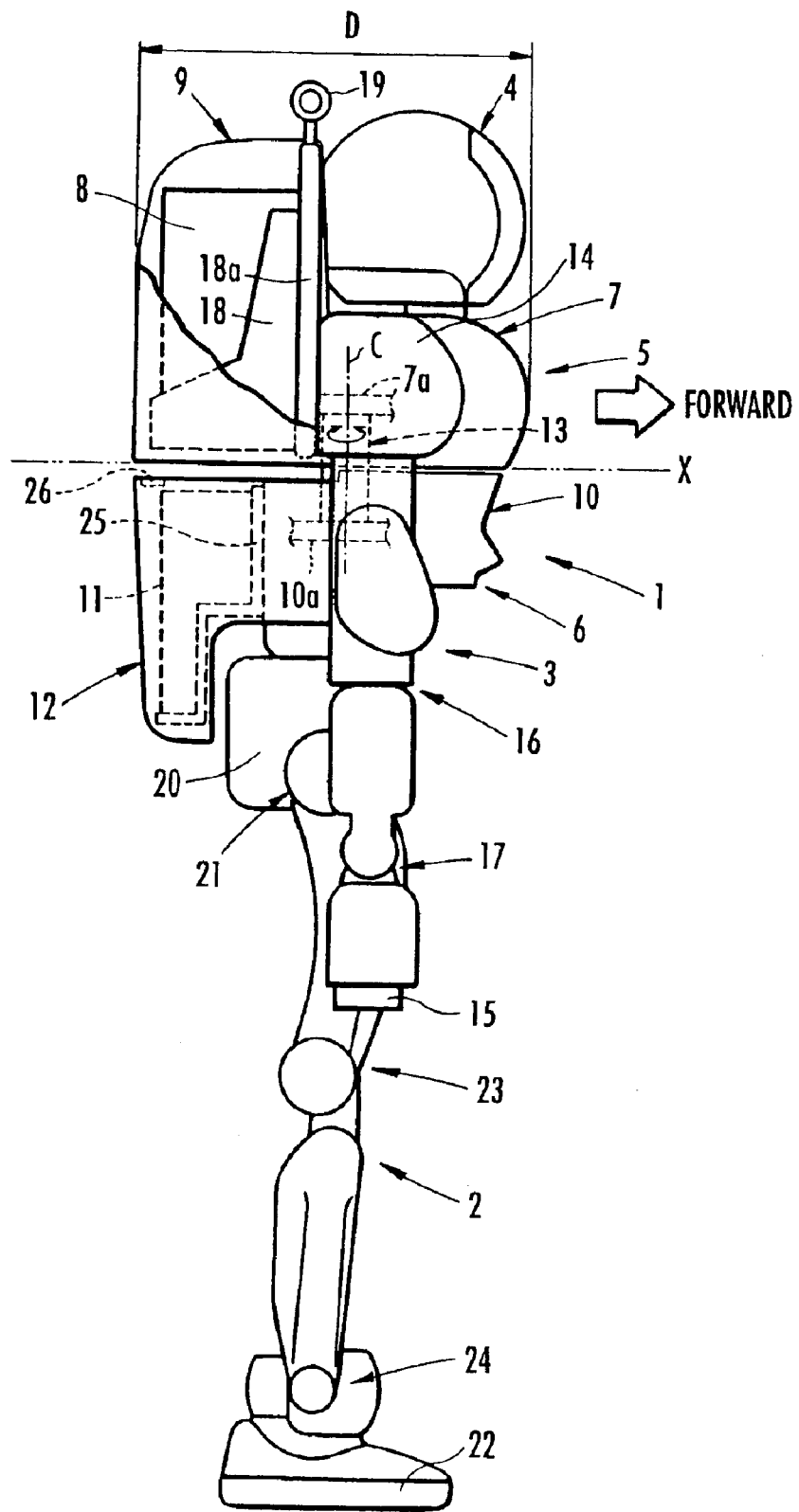
FIG. 1 is a side elevational view of a bipedal robot, in an upstanding state, according to an embodiment of the present invention.
Figure 2:
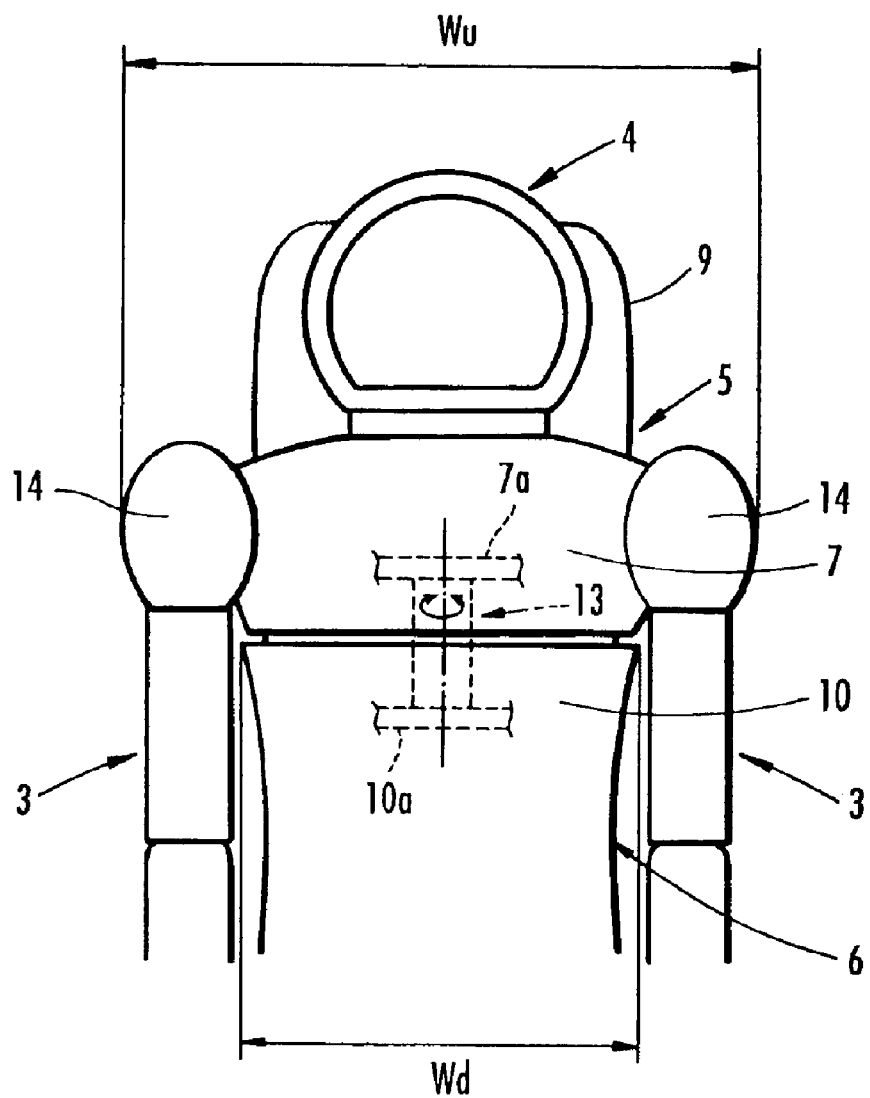
FIG. 2 is a simplified front elevational view of an upper body of the robot shown in FIG. 1.

As shown in FIG. 1, a bipedal robot according to the present embodiment is a human-shaped robot having an upper body 1 (torso), legs 2, arms 3, and a head 4. Since FIG. 1 is a side elevational view of the robot in an up-standing state, only one leg 2 and only one arm 3 are shown in FIG. 1. However, the robot actually has a pair of left and right legs 2 and a pair of left and right arms 3 like a human being (see FIG. 2 for the arms 3). The leg 2 and the arm 3 which are illustrated in FIG. 1 are a right leg and a right arm, respectively, as viewed in the forward direction of the robot.

The upper body 1 of the robot is divided into a higher upper body 5 above a hypothetical line X shown in FIG. 1 and a lower upper body 6 below the hypothetical line X. The higher upper body 5 comprises a higher main body 7 to which the arms 3 are coupled and which supports the head 4, and a higher auxiliary body 9 for mounting an electric energy storage device 8 as a power supply for operating the robot. The lower upper body 6 comprises a lower main body 10 to which the legs 2 are coupled, and a lower auxiliary body 12 for mounting a control unit 11 (an electric circuit unit having a microcomputer, etc, hereinafter referred to as ECU 11) for controlling the operation of the robot.

The higher main body 7 of the higher upper body 5 and the lower main body 10 of the lower upper body 6 house therein a rotating mechanism 13, with its axis C of rotation being oriented vertically, for rotating one of the main bodies 7, 10 with respect to the other thereof. The rotating mechanism 13 has an upper end held by a body frame 7a disposed in and integral with the higher main body 7, and a lower end held by a body frame 10a disposed in and integral with the lower main body 10.

Though not shown in detail, the rotating mechanism 13 comprises a pair of rotors supported by bearings or the like for rotation relative to each other about the axis C of rotation as a common axis. One of the rotors of the rotating mechanism 13 is fixedly coupled to the body frame 7a of the higher main body 7, and the other rotor is fixedly coupled to the body frame 10a of the lower main body 10.

The higher upper body 5 having the higher main body 7 and the lower upper body 6 having the lower main body 10 is thus operatively coupled to each other by the rotating mechanism 13 for rotation relative to each other about the axis C of rotation of the rotating mechanism 13.

The higher upper body 5 and the lower upper body 6 are rotated relatively to each other by an electric motor (not shown) incorporated in the rotating mechanism 13. In FIG. 1, the upper body 1 is shown as being in a basic attitude state in which the higher upper body 5 and the lower upper body 6 have their forward/rearward directions aligned with each other.

Shoulders 14 are provided on respective left and right sides of an upper portion of the higher main body 7 of the higher upper body 5. The arms 3 extend from shoulder joint mechanisms (not shown) placed in the shoulders 14. Each of the arms 3 has an elbow joint 12 and a wrist joint 17 disposed between a hand 15 and the shoulder 14 and arranged successively from the shoulder 14. A head 4 which houses an imaging device (not shown) for robot vision is fixed to and supported on an upper end of the higher main body 7.

The higher auxiliary body 9 of the higher upper body 5 is shaped as a casing removably mounted on a rear surface of an upper portion of the higher main body 7. The higher auxiliary body 9 has a support member 18 disposed therein and fixed to the rear surface of the upper portion of the higher main body 7 for mounting the electric energy storage device 8 thereon. The electric energy storage device 8 is removably mounted and supported on the support member 18. The support member 18 has a portion 18a disposed near the higher main body 7 and extending from a position behind the rear surface of the higher main body 7 to a position behind a rear surface of the head 4. An engaging loop 19 (holder) is fixed to the upper end of the portion 18a and projects above the head 4 for engaging a hook (not shown) which is used to suspend and hold the robot when the robot is inactivated.

According to the present embodiment, the electric energy storage device 8 comprises a rechargeable secondary battery such as a lithium ion battery or the like. However, the electric energy storage device 8 may comprise a large-capacity capacitance such as an electric double-layer capacitor.

The lower main body 10 of the lower upper body 6 has a hip 20 at its lower end. The legs 2 extend downwardly from a pair of left and right hip joints 21, respectively, coupled to a parallel link mechanism (not shown) placed in the hip 20. Each of the legs 2 has a knee joint 23 and an ankle joint 24 disposed between a foot 22 and the hip joint 21 and arranged successively from the hip joint 21.

The lower auxiliary body 12 of the lower upper body 6 is shaped as a casing disposed immediately below the higher auxiliary body 9 with a slight clearance left between itself and the higher auxiliary body 9, and removably mounted on an upper portion of the lower main body 10. The lower auxiliary body 12 houses therein a support member 25 fixed to a rear surface of the upper portion of the lower main body 10 for placing the ECU 11 thereon. The ECU 11 is mounted and supported on the support member 25.

A circuit board 26 having an array of terminals for checking operation of the ECU 11, for example, is fixedly mounted, as an electric component associated with the ECU 11, on a peripheral edge (corner) of an upper end surface of the lower auxiliary body 12 near its rear portion. When the robot is in an upstanding state as shown in FIG. 1, the circuit board 26 is concealed by the higher auxiliary body 9 directly above the lower auxiliary body 12. When the higher upper body 5 is rotated with respect to the lower upper body 6 about the axis of rotation of the rotating mechanism 13, the circuit board 26 is exposed out.

Although not shown, the bipedal robot according to the present embodiment also has, in addition to the above structural details, electric motors for actuating the joints of the legs 2 and the arms 3, sensors for detecting angular displacements of the electric motors (angular displacements of the joints), sensors for detecting loads and moments acting on the feet 22 of the legs 2 and the hands 15 of the arms 3, and sensors for detecting an angle of inclination and an angular velocity of inclination of the upper body 1.

The ECU 11 controls the electric motors (including an electric motor for the rotating mechanism 13) based on information obtained from the sensors (including the imaging device in the head 4) and a predetermined program thereby to control operation of the robot (i.e., to control the walking of the robot through operation of the legs 2, and to control the working of the robot through operation of the arms 3). In the present embodiment, the ECU 11 controls operation of the joints of the legs 2 based on an inverted pendulum-type dynamic model as disclosed in Japanese laid-open patent publication No. 5-337849 or U.S. Pat. No. 5,459,659, for thereby controlling attitude stabilization when the robot walks and works.

In the present embodiment, the higher upper body 5 which is comprised of the higher main body 7 and the higher auxiliary body 9 is of such a size that it has a thickness D in a forward/rearward direction (see FIG. 1, hereinafter referred to as chest thickness D) smaller than a width Wu in a lateral direction at the left and right shoulders 14 of the robot (see FIG. 2, hereinafter referred to as shoulder width Wu). The shoulder width Wu is equal to the maximum width in the lateral direction of the entire upper body 1 (including the shoulders 14) which is comprised of the higher upper body 5 and the lower upper body 6. The lower upper body 6 has a width Wd in the lateral direction (which is the maximum width in the lateral direction of the lower upper body 6) also smaller than the shoulder width Wu.

Figure 3:
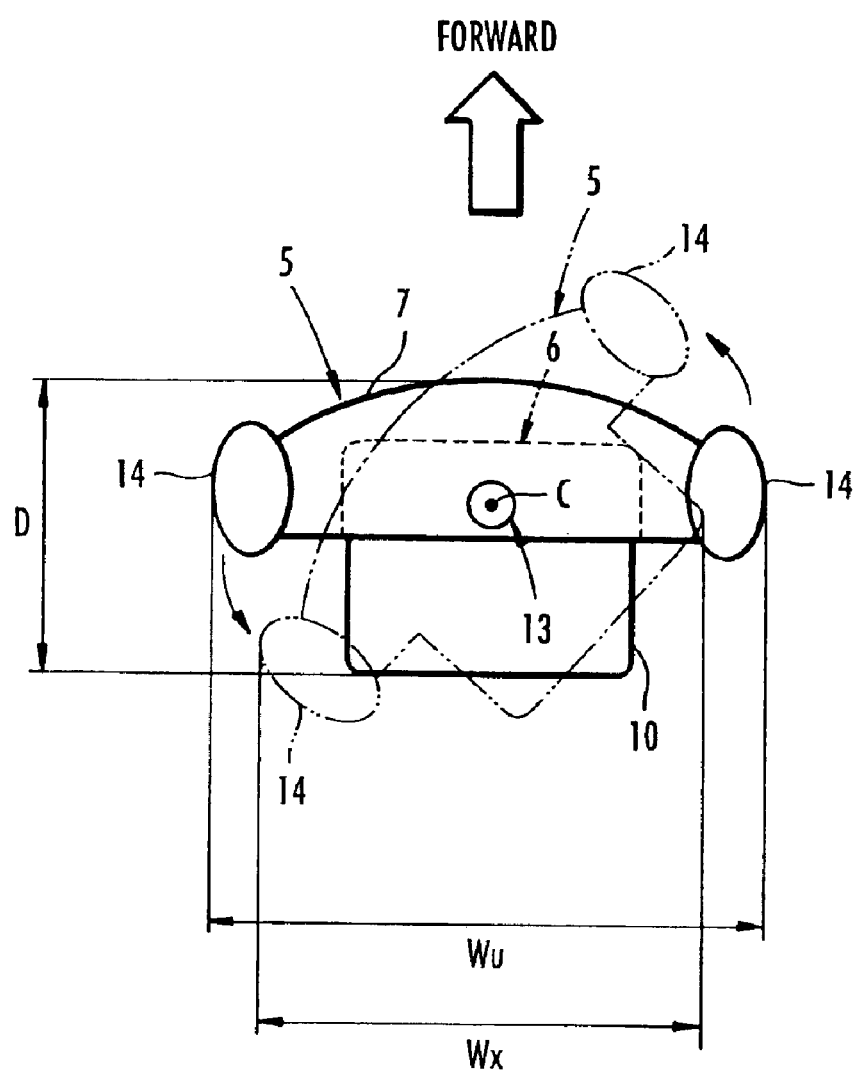
FIGS. 3 and 4 are views illustrative of the manner in which the robot shown in FIG. 1 operates.

With the bipedal robot of the above structure according to the present embodiment, when the rotating mechanism 13 is operated to rotate the higher upper body 5 with respect to the lower upper body 6 about the axis of rotation of the rotating mechanism 13 from the basic attitude state of the upper body 1, one of the left and right shoulders 14 moves forwardly of the lower upper body 6, as shown in FIG. 3. FIG. 3 schematically shows the higher upper body 5 and the lower upper body 6 as viewed from above. The higher upper body 5 and the shoulders 14 are positioned as indicated by the solid lines when the upper body 1 is in the basic attitude state. The higher upper body 5 and the shoulders 14 are positioned as indicated by the imaginary lines when the higher upper body 5 is rotated counterclockwise, for example, about the axis C of rotation of the rotating mechanism 13. Upon rotation of the higher upper body 5, the right shoulder 14 is moved forwardly of the lower upper body 6 from the basic attitude state.

As described above, one of the shoulders 14 (the right shoulder 14 in FIG. 3) is moved forwardly of the lower upper body 6 when the higher upper body 5 is rotated with respect to the lower upper body 6 about the axis of rotation of the rotating mechanism 13 from the basic attitude state of the upper body 1. Therefore, when the arm 3 extending from the moved shoulder 14 (the right arm 3 in FIG. 3) is extended forwardly of the lower upper body 6, the hand 15 of the arm 3 can reach a farther position forward of the lower upper body 6 without the need for moving the robot in its entirety forwardly by operating the legs 2. Thus, the arm 3 can work at the farther position forward of the lower upper body 6. At this time, since the other shoulder 14 (the left shoulder 14 in FIG. 3) is moved rearwardly, the rearward arm 3 and the forward arm 3 can easily be balanced in weight even though the forward arm 3 is extended forwardly of the lower upper body 6, thus easily achieving the stability of the attitude of the robot.

The higher upper body 5 can have its forward/rearward direction oriented in various directions by rotating the higher upper body 5 with respect to the lower upper body 6. Therefore, for gripping an object present laterally of the robot with the arms 3 when the upper body 1 is in the basic attitude state, the legs 2 remain in the same place on the floor and the higher upper body 5 is rotated with respect to the lower upper body 6 so as to face the object without the need for moving the legs 2 to change the orientation of the overall robot. When the higher upper body 5 faces the object, the object can easily be gripped by the arms. Therefore, even if the footing is unstable and any floor area where the robot can stand stably is limited to a small area, the legs can remain on such a floor area and the object present laterally of the lower upper body 6 can easily be gripped by the arms 3.

With the robot according to the present embodiment, as described above, the chest thickness D is smaller than the shoulder width Wu, and the maximum width Wd in the lateral direction of the lower upper body 6 is also smaller than the shoulder width Wu. Consequently, when the higher upper body 5 is rotated with respect to the lower upper body 6, as shown in FIG. 3, the maximum width (Wx in FIG. 3) of the entire upper body 1 in the lateral direction of the lower upper body 6 in the rotated state can be smaller than the shoulder width Wu which is the maximum width in the lateral direction when the upper body 1 is in the basic attitude state. As a result, when the robot is to move in a passage narrower than the shoulder width Wu, the robot can move (walk) by rotating the higher upper body 5 with respect to the lower upper body 6.

Figure 4:
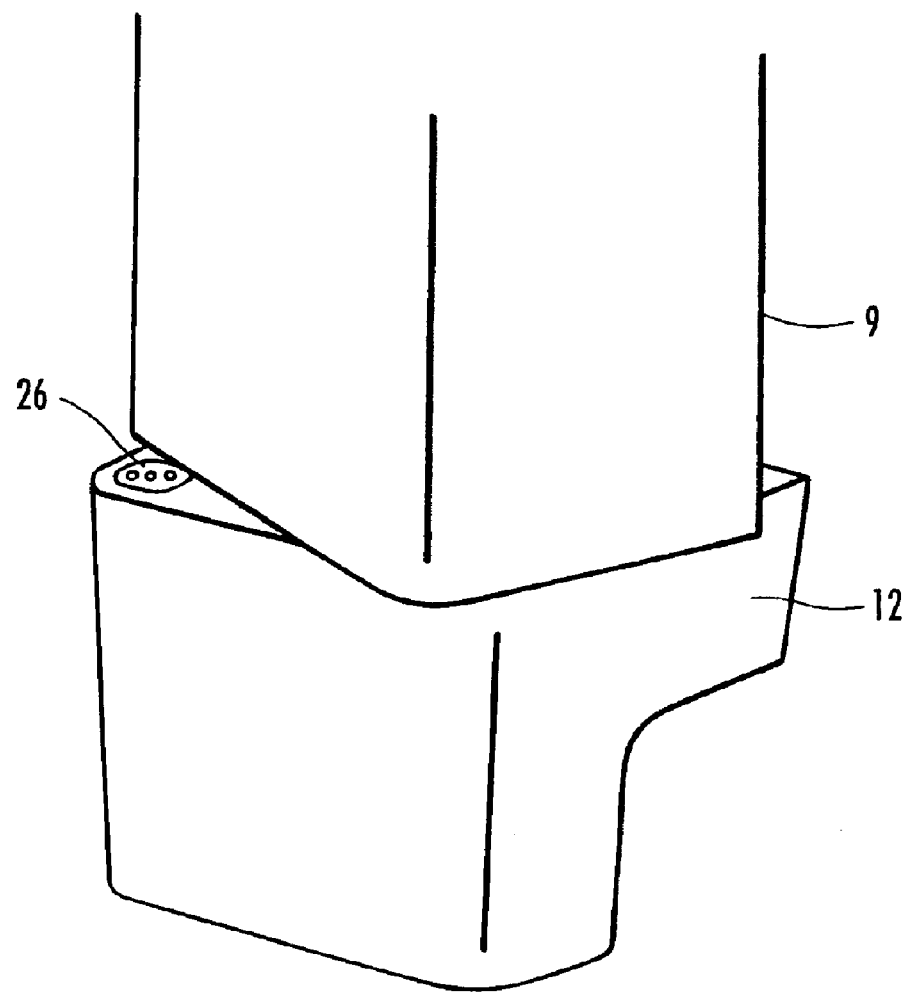

With the robot according to the present embodiment, when the higher upper body 5 is rotated with respect to the lower upper body 6 from the basic attitude state of the upper body 1, as shown in FIG. 4, the circuit board 26 on the peripheral edge of the upper end surface of the lower auxiliary body 12 of the lower upper body 6 is exposed out. In FIG. 4, only the higher auxiliary body 9 of the higher upper body 5 and the lower auxiliary body 12 of the lower upper body 6 are simply shown.

Therefore, an external device may be connected to the terminals of the circuit board 26 for checking operation of the ECU 11 with ease.

With the robot according to the present embodiment, as the electric energy storage device 8 and the ECU 11 are mounted respectively in the higher upper body 5 and the lower upper body 6, the higher upper body 5 and the lower upper body 6 are balanced in size. Particularly, since the electric energy storage device 8 which is a heavy object is present in a high position close to the upper end of the overall robot, the behavioral characteristics of the robot attitude are well in conformity with the behavioral characteristics of an inverted pendulum. As a result, by controlling attitude stabilization of the robot based on an inverted pendulum-type dynamic model, the attitude stabilization of the robot can be controlled appropriately for achieving good attitude stability of the robot.

The ECU 11 which is highly required to avoid overheating is mounted in the lower upper body 6 below the electric energy storage device 8. Therefore, heat generated by the electric energy storage device 8 during operation of the robot is prevented from being applied to the ECU 11, which is thus reliably prevented from reaching excessively high temperatures.

While the robot according to the present embodiment is inactivated (with its power supply turned off), the robot cannot stand on its own. Therefore, the robot is suspended and held by a hook (not shown) engaging the engaging loop 19 (see FIG. 1).

Since the engaging loop 19 is fixed to the support member 18 of the higher upper body 5 which supports the electric energy storage device 8 that is a heavy object, the robot can be suspended and held while being kept in an appropriate attitude in which it is unlikely for various parts of the robot to be subjected to burdens (excessive loads or the like) when the robot is suspended. While the robot is being suspended, the weight of the lower portion of the robot including the lower upper body 6 acts on the rotating mechanism 13. However, inasmuch as the heavy electric energy storage device 8 is not mounted in the lower portion of the robot, a large load (a tensile load) is prevented from being imposed on the rotating mechanism 13. Accordingly, the rotating mechanism 13 may have a relatively low level of resistance to a tensile load. As a result, the rotating mechanism 13 may be of a relatively simple structure.

In the embodiment described above, the electric component (the circuit board 26 in the embodiment) which is exposed out when the higher upper body 5 is rotated with respect to the lower upper body 6 is disposed on the peripheral edge of the upper end surface of the lower auxiliary body 12 of the lower upper body 6. However, the electric component may be mounted on a peripheral edge of a lower end surface of the higher auxiliary body 9 of the higher upper body 5. The electric component mounted on the peripheral edge of the lower end surface of the higher auxiliary body 9 may be, for example, a terminal for charging the electric energy storage device 8 mounted in the higher upper body 5.

INDUSTRIAL APPLICABILITY

The bipedal robot according to the present invention is useful as a robot which moves on two legs and performs various works with two arms, like a human being.

What is claimed is:

1. A bipedal robot having two legs extending from a lower end of an upper body and two arms extending from shoulders on opposite sides of the upper body, wherein:

said upper body comprises a higher upper body and a lower upper body, said higher upper body and said lower upper body being coupled to each other by a rotating mechanism having a vertical axis of rotation, and being rotatable with respect to each other about said vertical axis of rotation;

said two arms extend from said higher upper body and said two legs extend from said lower upper body; and said robot comprises an electric energy storage device as a power supply for operating the robot, wherein said electric energy storage device is mounted in said higher upper body;

wherein an electric component is mounted on either one of a lower end surface of said higher upper body and an upper end surface of said lower upper body such that said electric component is exposed when said rotating mechanism is operated to rotate one of said higher upper body and said lower upper body with respect to the other thereof.

2. The bipedal robot according to claim 1, wherein said higher upper body has a thickness in a forward/rearward direction which is smaller than a width of said robot in a lateral direction at said shoulders, and said lower upper body has a width in the lateral direction which is smaller than the width of said robot in the lateral direction at said shoulders.

3. The bipedal robot according to claim 1, wherein a holder is fixed to said higher upper body for suspending and holding said robot.

4. The bipedal robot according to claim 1, further comprising an electronic circuit unit for controlling operation of the robot, and wherein said electronic circuit unit is mounted in said lower upper body.

5. A bipedal robot having two legs extending from a lower end of an upper body and two arms extending from shoulders on opposite sides of the upper body, characterized in that said upper body comprises a higher upper body and a lower upper body, said higher upper body and said lower upper body being coupled to each other by a rotating mechanism having a vertical axis of rotation, and being rotatable with respect to each other about said axis of rotation;

said two arms extend from said higher upper body and said two legs extend from said lower upper body; and said robot comprises an electronic circuit unit for controlling operation of the robot, wherein said electronic circuit unit is mounted in said lower upper body.

6. A bipedal robot according to claim 5, wherein said higher upper body has a thickness in a forward/rearward direction which is smaller than a width of said robot in a lateral direction at said shoulders, and said tower upper body has a width in the lateral direction which is smaller than a width of said robot in the lateral direction at said shoulders.

7. A bipedal robot according to claim 5, wherein a holder is fixed to said higher upper body for suspending and holding said robot.

8. A bipedal robot according to claim 5, characterized in that an electric component is mounted on either one of a lower end surface of said higher upper body and an upper end surface of said lower upper body, such that said electric component is exposed when said rotating mechanism is operated to rotate one of said higher upper body and said lower upper body with respect to the other thereof.

* * * * *

UNITED STATES PATENT AND TRADEMARK OFFICE
CERTIFICATE OF CORRECTION

| | | |
|---|---|---|
| PATENT NO. | : 6,945,341 B2 | Page 1 of 1 |
| DATED | : September 20, 2005 | |
| INVENTOR(S) | : Ogawa et al. | |

It is certified that error appears in the above-identified patent and that said Letters Patent is hereby corrected as shown below:

Column 10,
Line 21, delete "tower" and insert -- lower --.

Signed and Sealed this

Seventh Day of February, 2006

JON W. DUDAS
*Director of the United States Patent and Trademark Office*